(12) United States Patent
Fröhlich et al.

(10) Patent No.: US 10,983,214 B2
(45) Date of Patent: Apr. 20, 2021

(54) LASER SCANNER COMPRISING A REMOVEABLE INTERNAL MEMORY CONTROLLING FUNCTION OF THE SCANNER

(71) Applicant: ZOLLER & FRÖHLICH GMBH, Wangen im Allgäu (DE)

(72) Inventors: Christoph Fröhlich, Wangen (DE); Markus Mettenleiter, Isny (DE)

(73) Assignee: ZOLLER & FRÖHLICH GMBH, Wangen im Allgäu (DE)

( * ) Notice: Subject to any disclaimer, the term of this patent is extended or adjusted under 35 U.S.C. 154(b) by 255 days.

(21) Appl. No.: 16/332,737

(22) PCT Filed: Sep. 6, 2017

(86) PCT No.: PCT/EP2017/072365
§ 371 (c)(1),
(2) Date: Mar. 12, 2019

(87) PCT Pub. No.: WO2018/050516
PCT Pub. Date: Mar. 22, 2018

(65) Prior Publication Data
US 2020/0241116 A1    Jul. 30, 2020

(30) Foreign Application Priority Data

Sep. 15, 2016  (DE) ............ 10 2016 117 431.9
Oct. 7, 2016   (DE) ............ 10 2016 119 155.8
Jun. 30, 2017  (DE) ............ 10 2017 114 617.2

(51) Int. Cl.
*G01S 7/48*   (2006.01)
*G01S 17/42*  (2006.01)
(Continued)

(52) U.S. Cl.
CPC ............ *G01S 17/42* (2013.01); *G01S 7/4813* (2013.01); *G01S 7/4817* (2013.01); *G01S 17/86* (2020.01);
(Continued)

(58) Field of Classification Search
CPC ........... G06K 7/10544; G06K 7/10722; G06K 7/1413; G01S 7/4813; G01S 7/4817
(Continued)

(56) References Cited

U.S. PATENT DOCUMENTS 9,243,897 B2 * 1/2016 Kumagai ............... G01C 1/04
2003/0058738 A1  3/2003 Erikson
(Continued)

FOREIGN PATENT DOCUMENTS

DE  198 51 307 A1   4/2000
DE  101 50 436 B4   5/2008
(Continued)

OTHER PUBLICATIONS

Oct. 22, 2020 Notice of Allowance Issued in U.S. Appl. No. 16/332,753.
(Continued)

*Primary Examiner* — Que Tan Le
(74) *Attorney, Agent, or Firm* — Oliff PLC

(57) ABSTRACT

A laser scanner in which scanning data and logging data are only stored in an internal data memory which can be exchanged in a simple manner.

12 Claims, 6 Drawing Sheets

(51) Int. Cl.
*G01S 17/86* (2020.01)
*G01S 17/89* (2020.01)
*G03B 15/03* (2021.01)
*G03B 17/48* (2021.01)
*G03B 37/02* (2021.01)
*H04N 5/225* (2006.01)
*G01S 7/481* (2006.01)

(52) U.S. Cl.
CPC .............. *G01S 17/89* (2013.01); *G03B 15/03* (2013.01); *G03B 17/48* (2013.01); *G03B 37/02* (2013.01); *H04N 5/2256* (2013.01)

(58) Field of Classification Search
USPC .................................. 250/235, 236, 231.13
See application file for complete search history.

(56) References Cited

U.S. PATENT DOCUMENTS

| | | |
|---|---|---|
| 2006/0126060 A1 | 6/2006 | Colle et al. |
| 2010/0208318 A1 | 8/2010 | Jensen et al. |
| 2010/0214168 A1 | 8/2010 | Stucki |
| 2010/0245849 A1 | 9/2010 | Satzky et al. |
| 2014/0111618 A1 | 4/2014 | Kumagai et al. |
| 2014/0300906 A1 | 10/2014 | Becker et al. |
| 2015/0085110 A1 | 3/2015 | Pettersson et al. |
| 2015/0098075 A1 | 4/2015 | Bestler et al. |
| 2017/0184394 A1 | 6/2017 | Ditte et al. |

FOREIGN PATENT DOCUMENTS

| | | |
|---|---|---|
| DE | 10 2012 105 027 A1 | 1/2013 |
| DE | 20 2013 001 538 U1 | 3/2013 |
| DE | 10 2014 110 809 A1 | 9/2015 |
| DE | 10 2014 109 432 A1 | 10/2015 |
| DE | 10 2016 102 607 A1 | 8/2016 |
| EP | 2 860 550 A1 | 4/2015 |

OTHER PUBLICATIONS

"Trimble® TX5 3D Laser Scanner Quick Start Guide," Trimble, 2012, pp. 1-8.

"Trimble TX5 3D Laser Scanner User Guide," Trimble, Oct. 2012, 125 pages.

Feb. 6, 2018 International Search Report issued in International Patent Application No. PCT/EP2017/072347.

Mar. 19, 2019 International Preliminary Report on Patentability issued in International Patent Application No. PCT/EP2017/072347.

Nov. 29, 2017 International Search Report issued in International Patent Application No. PCT/EP2017/072365.

Mar. 19, 2019 International Preliminary Report on Patentability issued in International Patent Application No. PCT/EP2017/072365.

U.S. Appl. No. 16/332,753, filed Mar. 12, 2019 in the name of Fröhlich et al.

May 28, 2020 Office Action Issued in U.S. Appl. No. 16/332,753.

\* cited by examiner

LASER SCANNER COMPRISING A REMOVEABLE INTERNAL MEMORY CONTROLLING FUNCTION OF THE SCANNER

The invention relates to a laser scanner according to the preamble of patent claim 1.

The basic structure of such laser scanners is disclosed, for example, in DE 101 50 436 B4. It describes a 3D laser scanner with which measuring objects such as buildings, crime scenes, production facilities, etc. can be measured with high accuracy. In such a scanner the measuring beam emitted by a laser diode is deflected by a mechanical beam-deflection system in such a way that an area-wide, three-dimensional, spatial environmental measurement is possible. The digitalized measuring data are processed and stored by a calculator unit and are available there for further processing and visualization of the measured object.

This 3D measurement is carried out by guiding the modulated laser light over the environment to be measured, whereby both the distance value and the reflection value can be measured separately for different spatial directions. Distance and reflectivity images result from the arrangement of all measured spatial directions. The distance images show the geometry of the environment and the reflectivity images their visual representation, analogous to the gray-value images of a video camera. Both images correspond pixel by pixel and are largely independent of environmental influences due to the independent, active illumination with laser light.

In the known solution, the beam-deflection system is designed with a deflection mirror, which is mounted in a rotating head—hereinafter referred to as rotor—of the laser scanner. This is rotatably mounted around a first axis, preferably a horizontal axis, on a housing of the scanner, which in turn can be rotated by at least 180° around a pivot axis that is perpendicular to the axis of rotation, for example in the vertical direction. As mentioned above, such a 3D laser scanner detects the image information in the form of 3D pixel clouds, which can then be converted into a gray-value image of the measuring object.

In many cases, a color representation of the measuring object is desired. The color information can be scanned by a camera, which is mounted on the housing of the laser scanner, for example. Solutions are also known in which the color information of the measuring object is detected by a camera mounted in the beam path of a mirror arrangement. The disadvantage of such a solution is that deflection mirrors and other optical elements that may be present can cause color falsifications of the camera image. Systems with a camera mounted on the housing of the laser scanner have the disadvantage that they require considerable installation space and, furthermore, parallax errors occur due to the different perspectives of the mounted camera and the actual laser scanner, which must be eliminated by a complex Z-buffer calculation. In order to overcome this disadvantage, DE 10 2012 105 027 A1 describes a laser scanner in which the color camera is mounted on or in the measuring head/rotating head to capture the color information of the measuring object, so that the virtual optical centers of the camera and the measuring beam substantially coincide and thus a parallax error is avoided.

The concept of signal processing in laser scanners is explained in DE 198 51 307 A1 of the Applicant.

Corresponding concepts can also be implemented for 2D laser scanners in which the laser scanner cannot be swiveled about a vertical axis but is mounted on a mobile platform.

DE 10 2014 109 432 A1 describes a laser scanner which is additionally equipped with a thermographic camera so that the measurement result is obtained as a 3D scan (point cloud of the measuring object) with linked thermographic data.

Since complex measuring objects are measured from different locations, such laser scanners can be equipped with a navigation system that detects the respective scanner location and scanner orientation. As described in DE 10 2016 102 607 A1 of the Applicant, such navigation systems integrated into the laser scanner are designed in such a way that they enable GNSS (e.g. GPS) independent determination of the absolute position of the laser scanner or at least a relative position to a known location in the field. In this way, the measurement of indoor spaces is made possible. These navigation data are also stored in the internal memory of the laser scanner for measuring signal processing.

In particular the measurement of military objects or of nuclear power plants or safety-relevant production facilities is subject to the condition that the measurement and evaluation take place within the facility and that no data must be transmitted or transferred from the facility. With conventional laser scanners, this accordingly means that the entire 3D measurement has to be completed and evaluated within the facility, and subsequently the corresponding data on the hard disk of the calculator unit of the laser scanner and other external computers have to be deleted. This entails a considerable effort, as it must be ensured that all data have been removed and that corresponding proof also has to be provided to the facility operator.

In view of this, the invention is based on the object of creating a 2D or 3D laser scanner that enables reliable and simple removal of the recorded and evaluated scan.

According to the invention, this object is solved by a laser scanner with the features of patent claim 1.

Advantageous further developments of the invention are the subject matter of the dependent claims.

The laser scanner according to the invention has a rotor which is rotatably mounted on a housing, wherein a beam-deflection system is arranged in the rotor to direct a measuring beam emitted by an emitter, e.g. a laser diode, onto a measuring object or a beam reflected by it onto a receiver. The laser scanner is equipped with a calculation unit for controlling the laser scanner and for data processing, which is provided with a data memory for storing measuring data. According to the invention, the data memory is removably held in an accommodation of the housing. The term "removable" means that the holder is designed for quick and easy changing or removing of the data memory without requiring time-consuming disassembly of components. The calculation unit is preferably designed so that the relevant measuring data (scan data and logging files) can only be stored on this data memory.

In one variant, the operating system and the software for controlling the scanner can be stored on an internal memory, e.g. a flash memory. This memory is designed in such a way that no measuring data can be stored on it and it is thus provided with write protection.

Alternatively, the software required for controlling the laser scanner and the operating system can also be implemented on the data memory, so that the scanner is no longer functional after removing the data memory.

The measure of storing at least the measuring data (3D pixel cloud and associated color information, logging files) recorded during the measuring process on the data memory makes it very easy to meet the requirements mentioned above by removing the data memory and leaving it on site or even deleting it.

In a preferred embodiment of the invention, the accommodation for the data memory is formed on the housing.

In the case that the scanner does not have to fulfill any of the above-mentioned security requirements, the internal data memory (e.g. an internal SSD drive (SATADOM)) can also be permanently installed in a conventional way. Then, an additional data storage device, e.g. an SD card, can be provided in particular is provided, to which the data can be copied. This SD card can then be inserted in a known manner into a slot of the housing which is accessible from the outside.

Using a Sata Disc On Module as internal data memory has the advantage that it does not require its own power connection, since the power is supplied via the Sata connection.

In an embodiment of the invention, the rotor is held between two housing parts, which are connected to each other by means of a housing intermediate part tapering towards the rotor—this is the typical structure of a 3D laser scanner.

In such laser scanners, the housing is rotatable by means of a rotary drive around a pivot axis arranged perpendicular to the axis of rotation of the rotor.

In an embodiment of the invention, it is provided that the rotary drive has a play-free gear, which is preferably designed as a gear train, wherein an encoder is assigned to the pivot axis of the housing in order to detect the respective angle of rotation of the laser scanner.

In order to enable measurement which is independent of an external power supply, laser scanners are often equipped with an accumulator. These accumulators have a relatively high weight, which has to be moved via the aforementioned rotary drive. In order to reduce the mass moment of inertia, it is suggested according to the invention that several accumulators, e.g. two accumulators, are arranged symmetrically at a comparatively small distance from the aforementioned pivot axis. Furthermore, it is preferred if these accumulators are arranged as closely as possible to the support of the laser scanner in order to also minimize a tilting moment. In addition, these accumulators are aerodynamically optimized with regard to the outer geometry in order to minimize air resistance during pivoting around the vertical axis. In this way, the measurement errors during the measurement of measuring objects can be further reduced.

It is preferred in a variant of the invention if the accumulators complement each other with a cover of the respective housing part to form a structural unit.

The laser scanner is particularly easy to operate when a touch display is arranged on a housing part. This touch display is arranged in a vertical format according to an embodiment.

The measuring accuracy can be further improved if the laser scanner is operated with three measuring frequencies according to the measuring principle of phase shift.

The removable data memory can, for example, be accessible when the accumulator is removed.

The Applicant reserves the right to base independent patent claims on the arrangement of the accumulators, or the use of three measuring frequencies, or the use of a play-free gear for the rotary drive, which may be further pursued in divisional applications.

Preferred embodiments of the invention are explained in more detail below using schematic drawings. They show:

Figure 1:
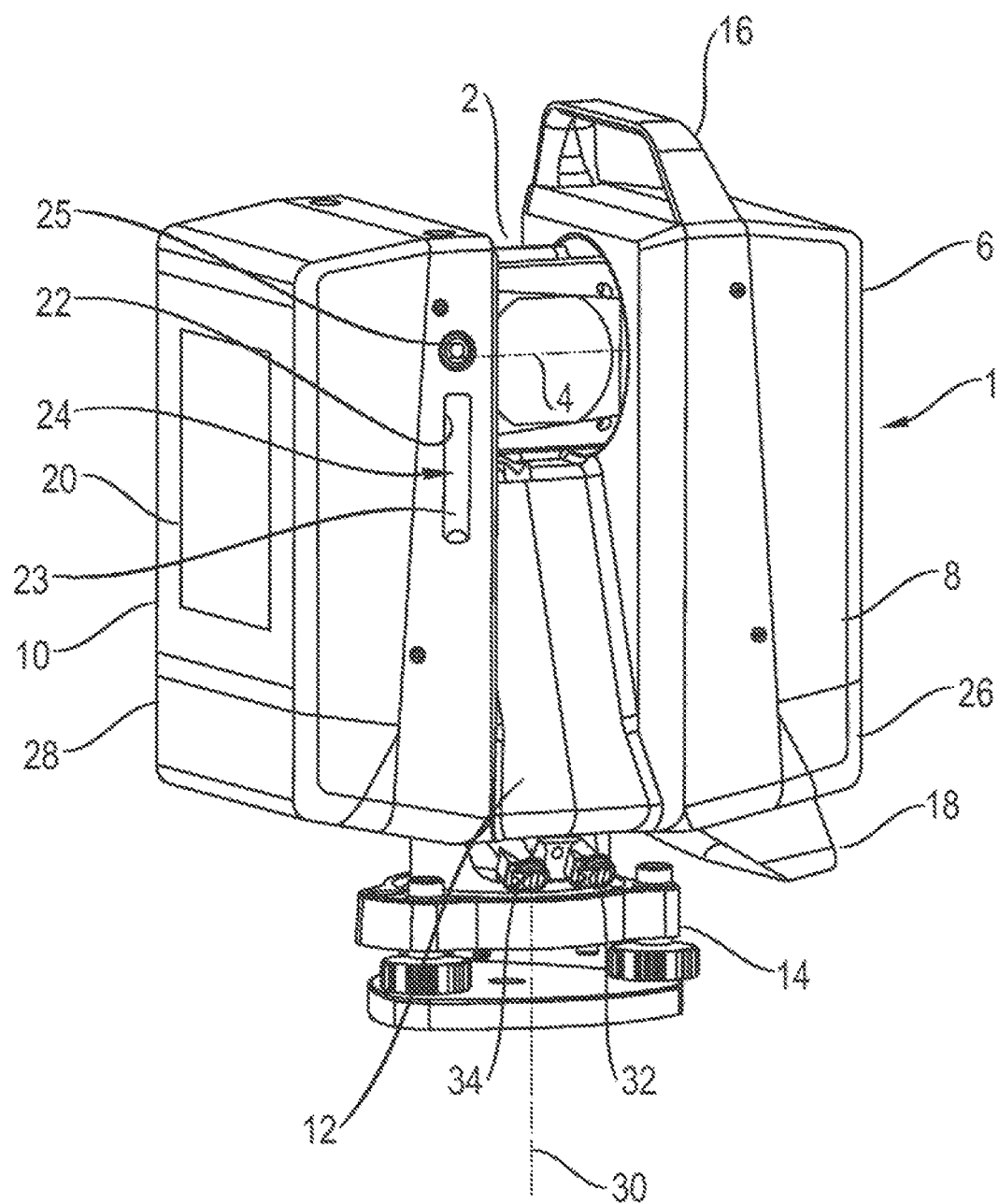
FIG. 1 shows a three-dimensional representation of an embodiment of a 3D laser scanner according to the invention.

FIG. 1 shows a three-dimensional representation of an embodiment of a 3D laser scanner 1, which has a measuring or rotating head, hereinafter referred to as rotor 2, which is mounted on a housing 6 of the laser scanner 1, rotatable about a horizontal axis of rotation 4 (see also FIGS. 2, 3). This housing 6 has—similar to the known solutions described at the beginning—two housing parts 8, 10, between which the rotor 2 extends. In the illustration shown in FIG. 1 below the rotor 2, the two housing parts 8, 10 are connected to each other by a housing intermediate part 12, which tapers towards the rotor 2 in a well-known manner in order to minimize shading during measurement.

The housing 6 is supported by an adjustable mounting flange 14 on a tripod or a movable platform, for example a hand trolley, as offered by the Applicant under the trade mark SCADDY®. In the embodiment shown in FIG. 1, the right housing part 8 is designed with two handles 16, 18 to simplify handling.

On the other housing part 10, a touch display 20 is arranged in vertical format, via which the laser scanner 1 can be operated and on which the measurement results can also be visually displayed.

As will be explained in more detail below, a calculation unit is accommodated in this housing part 10, whose data memory is kept according to the invention in an accommodation in such a way that it can be easily removed. This is explained in the following using FIG. 9. The internal data memory (SATADOM) described in more detail on the basis of FIG. 9 can be secured in a suitable manner so that accidental or unauthorized removal is made more difficult.

In an embodiment of the invention, a slot 22 covered by a cover 23 is designed to accommodate an additional data storage device, e.g. an SD card 24, to which measuring data can be copied. However, this variant does not comply with the security requirements mentioned above and is omitted for scanners that have to meet these requirements.

The laser scanner 1 is switched on and off via a switch 25. The laser scanner 1 shown in FIG. 1 is also designed for power-grid independent operation with two accumulators 26, 28, which are inserted flush into the respective housing parts 8, 10 and are arranged at a comparatively small distance from the mounting flange 14 in order to minimize a tilting moment.

In order to reduce the mass moment of inertia, the two accumulators 26, 28 are also arranged as closely as possible to a pivot axis 30, around which the entire laser scanner 1 can be rotated, so that the entire surrounding space can be measured when rotor 2 rotates around the axis of rotation 4 when rotating or pivoting around the pivot axis 30.

In the diagram shown in FIG. 1, a power connection 32 and a LAN connection 34 can also be seen, so that the laser scanner 1 can also be operated with an external power supply and the measuring signals can be transmitted via the LAN connection 34 to a satellite computer located in the field for recording and/or evaluation of the scan.

Of course, this recording and evaluation can also be performed on the laser scanner 1 itself.

The procedure for such recording and evaluation is explained in DE 10 2016 102 607 A1 of the Applicant.

Figure 2:
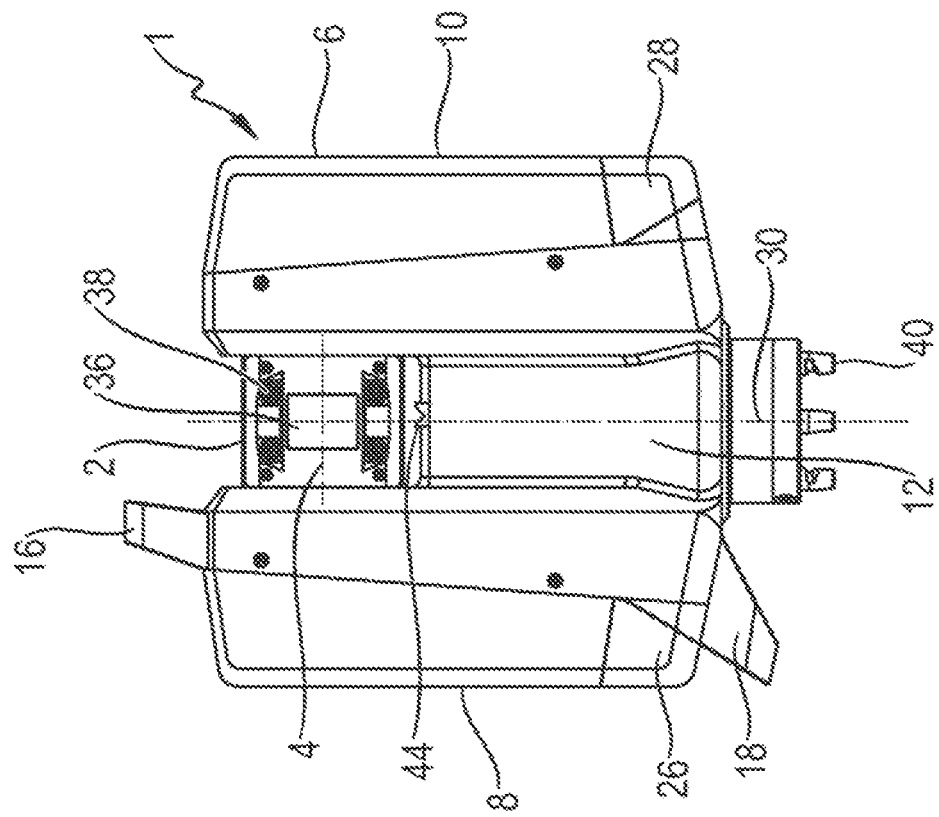

FIG. 2 shows a rear view of the laser scanner according to FIG. 1. Accordingly, a color camera 36 (strictly speaking only a camera window is visible here) is accommodated in rotor 2 to detect image/color information of the measuring object. In order to detect this image information with sufficient quality, the rotor 2 is equipped with a light unit 38, via which the image field can be illuminated. This light unit 38 has four LEDs in the embodiment shown, which are arranged in the circumferential area of the color camera 36 to ensure optimal illumination. Details of this light unit are explained in the parallel application with the file number DE 10 2017 114 617.2 of the Applicant.

In the illustration according to FIG. 2, the integration of the two accumulators 26, 28 into the housing parts 8, 10 can also be seen very clearly. The housing 6 is attached to the mounting flange 14 (not shown in FIG. 2) by means of three fastening bolts 40 lying on a pitch circle, of which only one is provided with a reference sign in the illustration according to FIG. 2.

Figure 3:
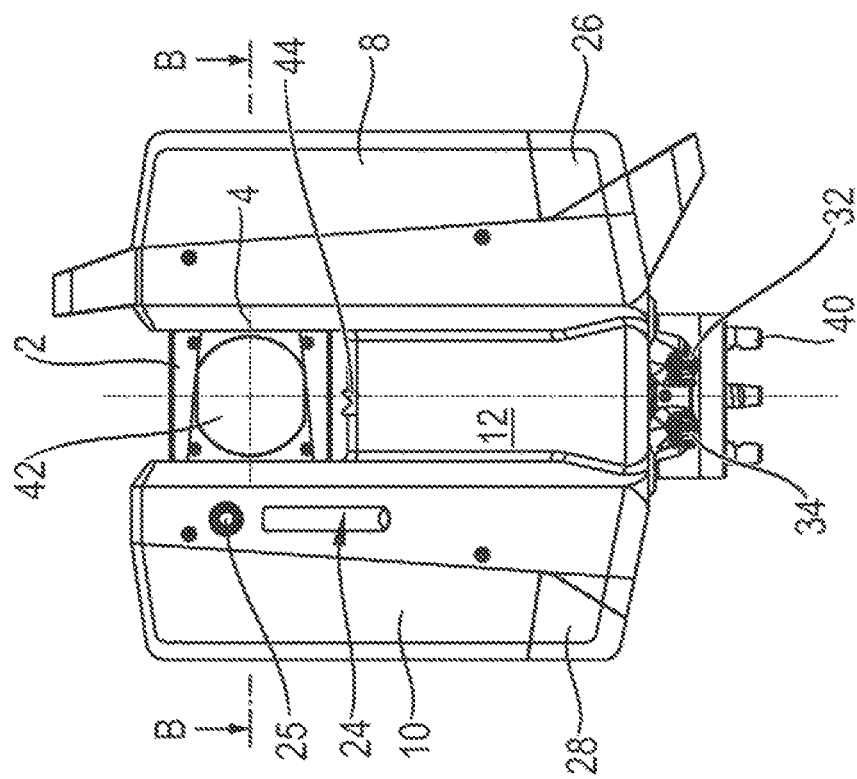
FIGS. 2 and 3 show a rear view or a front view of the laser scanner as shown in FIG. 1.

According to the front view in FIG. 3, the output or input of the laser optics is arranged at rotor 2; this is covered by an inclined protection glass 42, as described in DE 101 50 436 B4 stated at the beginning.

As can be seen from the illustrations according to FIGS. 1 to 3, the housing 6 of the laser scanner 1 has a smooth surface, for example without cooling fins or the like, so that the outer contour is also aerodynamically optimized and offers as little resistance as possible to wind or during rotating/pivoting of the laser scanner 1.

In the illustrations shown in FIGS. 2 and 3, a reference module 44 for distance measurement is also shown.

Figure 4:
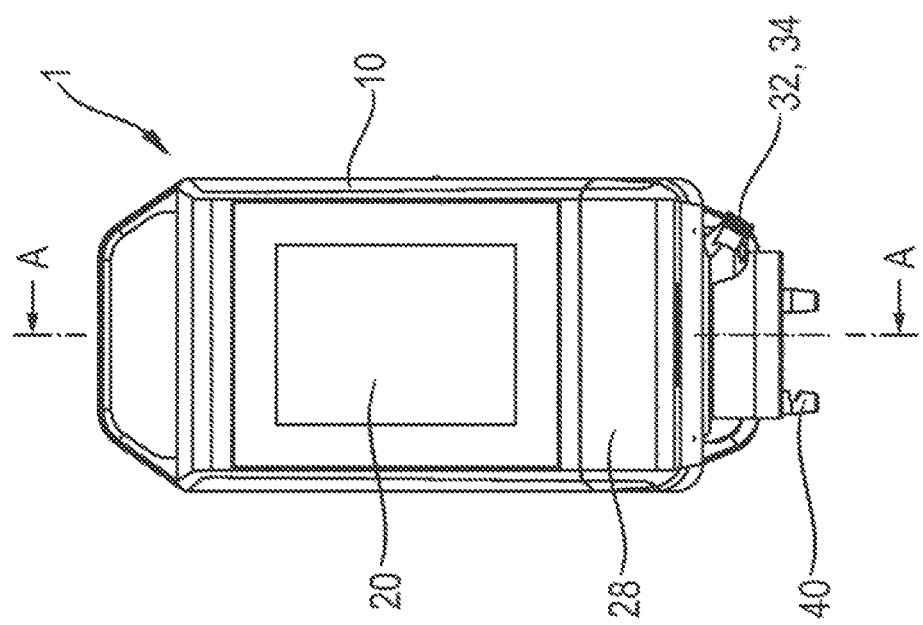
FIG. 4 shows a side view of the laser scanner.

FIG. 4 shows a side view of the housing part 10, on which the touch display 20 is arranged. The accumulator 28 is located underneath.

The accumulators/batteries 26, 28 are removably mounted on housing parts 8, 10, so that they can also be recharged via an external charging station. When connected to the electrical grid via the power connection 32, the accumulators 26, 28 are charged via the laser scanner 1.

Figure 5:
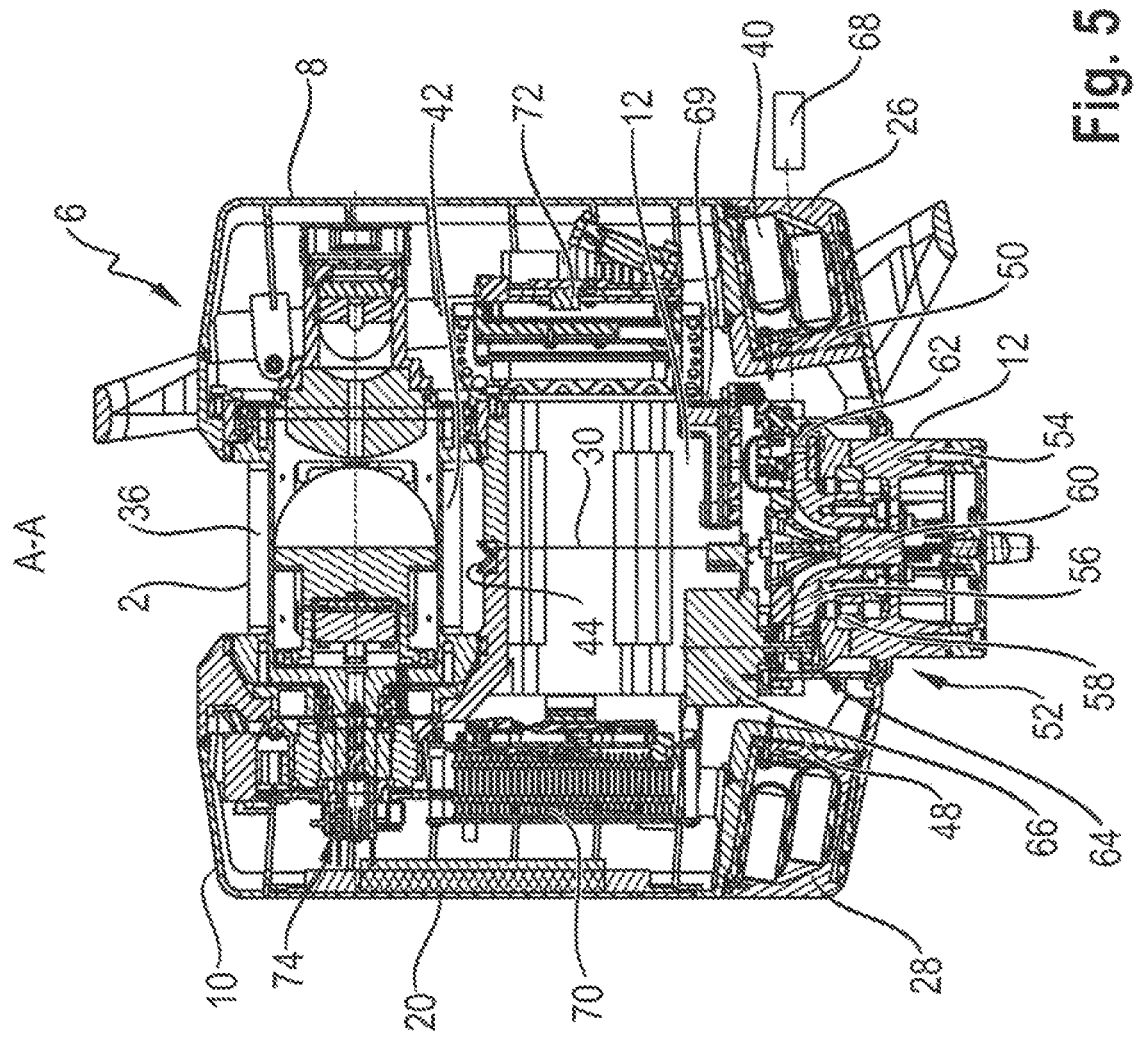
FIG. 5 shows a section along the line A-A in FIG. 4.

FIG. 5 shows a section along the line A-A in FIG. 4. In this illustration, the two accumulators 26, 28, which are each designed as a battery block with a plurality of rechargeable batteries 46, are clearly visible and are inserted into an accommodation 48, 50 of the respective housing part 8, 10.

In the section shown in FIG. 5, the basic principle of a rotary drive 52 can be seen, via which the housing 6 is driven for pivoting around the pivot axis 30. The housing 6 is mounted via the housing intermediate part 12 on a cantilevered pot-shaped base 54, whereby the housing intermediate part 12 is immersed into the base 54 via a drive hub 56 and is guided in the radial direction via a bearing arrangement 58 as well as a central axis 60.

The drive hub 56 is equipped with external teeth 62, which comb with a drive pinion 64, which is driven by a motor shaft of a motor 66, which is supported on the base 54. The drive pinion 64 and the external teeth 62 form a gear train that is free of play.

The respective rotation angle of the housing 6 and thus the rotation angle position of the color camera 36 and the laser beam is detected by an encoder 68 indicated in FIG. 5, which scans the rotation angle with reference to the center axis 60.

The play-free design of the gear train enables a high measuring accuracy of the encoder 68 and thus an exact determination of the angle of rotation. Usually, such encoders are arranged on the motor 66, so that the angular position of the housing 2 is only indirectly detected.

As mentioned above, the Applicant reserves the right to base a separate claim on the provision of a play-free gear, preferably a gear train, and on the determination of the angle of rotation by means of an encoder arranged on the axis.

In the illustration according to FIG. 5, also the calculation unit 70 mentioned at the beginning and accommodated in the housing part 10 is visible with the control modules required to operate the laser scanner 1. As shown in further detail in FIG. 9, this calculation unit 70 (CPU) has an internal flash memory that is not accessible from the outside. The operating system and the additional software for the operation of the laser scanner 1 are stored on this flash memory. It is not possible to write data to the flash memory, as write protection is provided.

Figure 9:
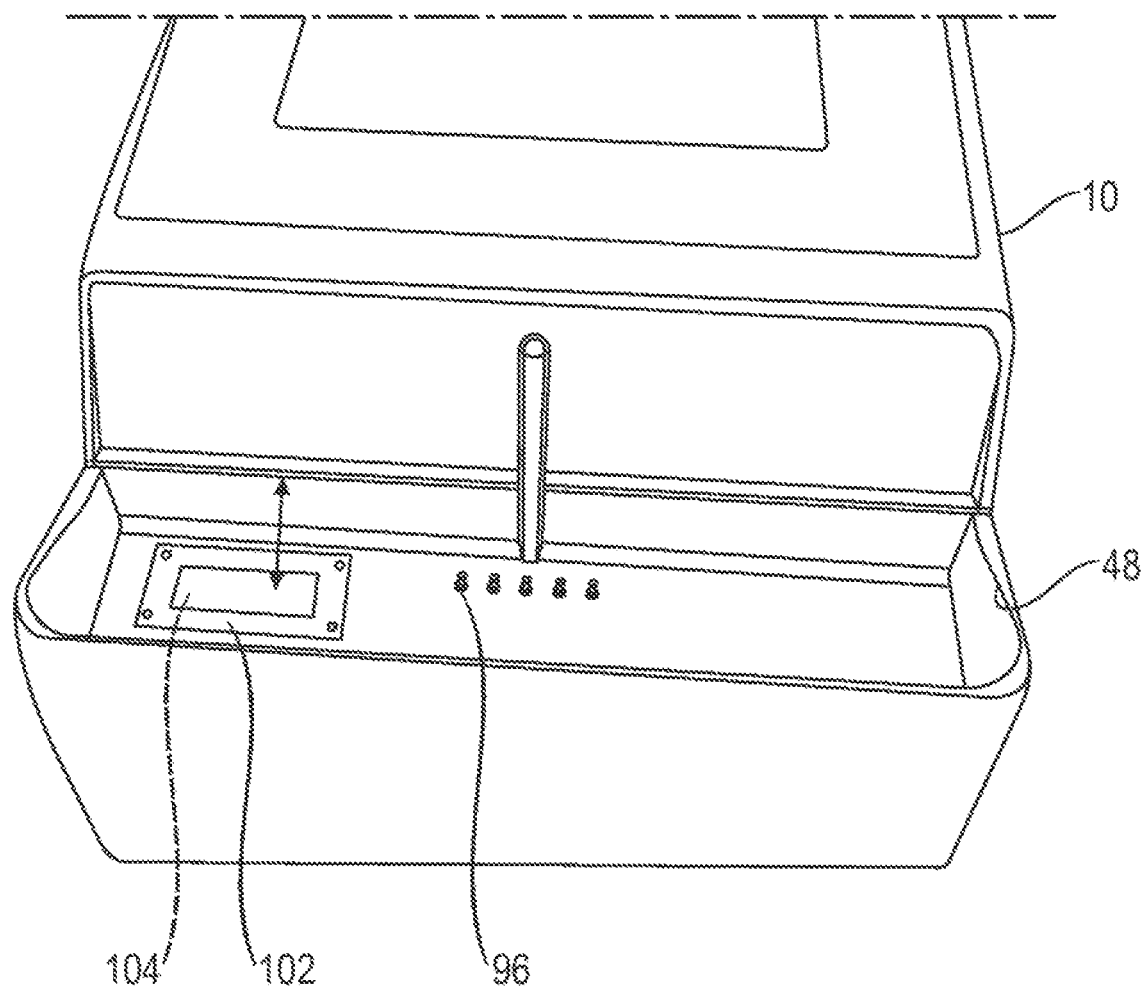
FIG. 9 shows a detailed representation of an accommodation of a data memory of the laser scanner according to FIG. 1.

The scan data and logging files are stored on an internal drive, which can be removed according to the invention; further details are explained in FIG. 9.

The SD card described above serves—as mentioned—only to copy the data stored on the drive. However, this option with the additional SD-card memory can be omitted. For applications with lower security requirements, it is not necessary to provide the internal drive (SATADOM) so that it can be exchanged. In this case, however, the option with the SD card is realized in order to simplify data processing on external computers and data backup.

The aforementioned rotor 2 is arranged in the upper area of the laser scanner 1 in FIG. 5. In between there is a unit called laser-radar measurement system 72, which is located opposite the calculation unit 70 and which is accommodated in the housing part 8. Among other things, this laser-radar measurement system 70 contains, among other things, at least one detector for detecting the signals reflected by the measuring object.

The image data detected by the color camera 36 are transferred to the calculation unit 70 via a detachable slip ring arrangement 74. The function of this slip ring arrangement 74 is explained in DE 10 2012 105 027 A1 mentioned at the beginning. Accordingly, this slip ring arrangement 74 is disengaged during distance measurement with the laser, so that friction during distance measurement is minimal. In order to detect the image data, the slip ring arrangement is then brought into operative engagement after the distance measurement, so that the image data detected by the color camera 36 are transferred to the calculation unit 70.

In the illustration shown in FIG. 5, an inclination measuring device 69 is provided with the reference sign 69, which can be used to detect an inclination of the laser scanner 1 so that the measured values can be corrected according to this inclination.

Figure 6:
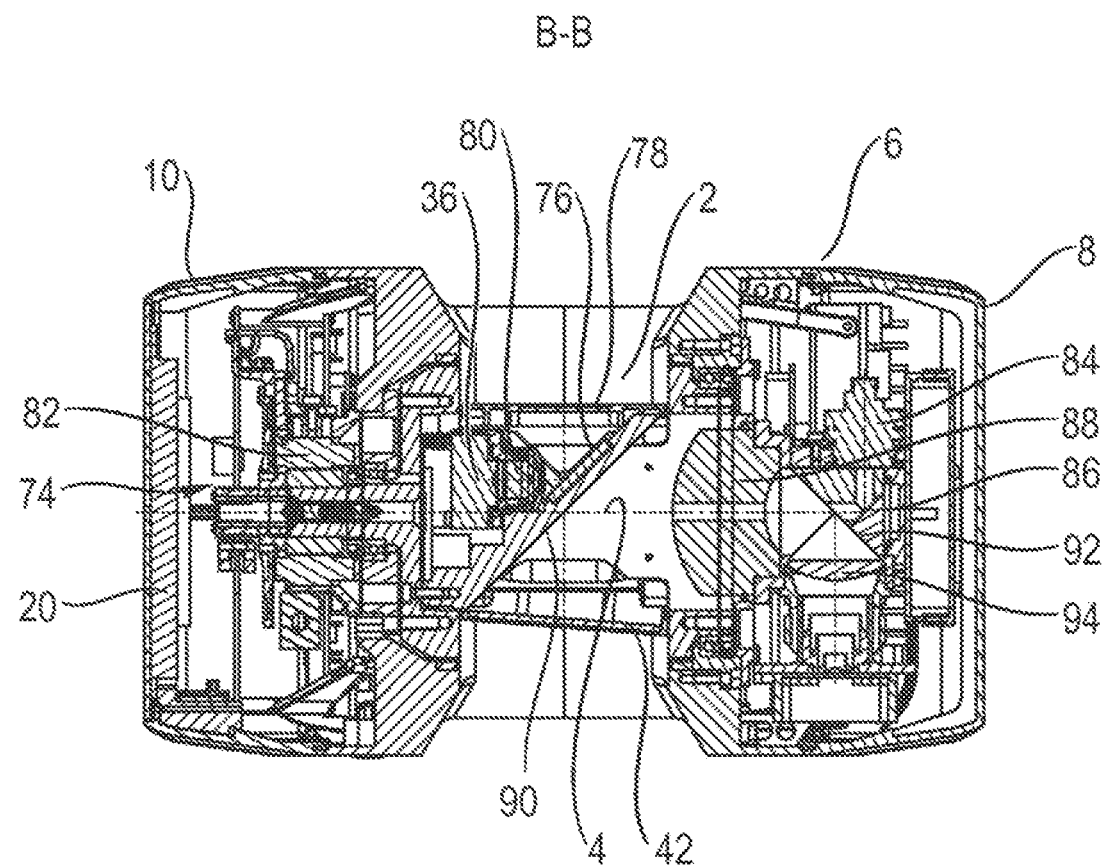
FIG. 6 shows a section along line B-B in FIG. 3.

The beam guidance of the distance measuring system is explained using FIG. 6, which shows a section along the line B-B in FIG. 3.

This sectional view shows the actual color camera 36, whose objective 80 is arranged approximately parallel to the axis of rotation 4. The color camera 36 can be a chip camera, for example, in which the actual accommodation chip and the objective 80 are arranged on a circuit board. The light beams carrying the color information of the object to be measured enter the rotor 2 via a camera window 78 and are deflected via a camera mirror 76 in the direction of the objective 80 of the color camera 36. The color information is then transferred to the calculation unit 70 via the slip ring arrangement 74 described above.

The rotor 2 is driven by a DC motor 82, which in turn has assigned an encoder for detecting the angle of rotation position of the rotor 2. The basic structure of such a rotor drive is explained in DE 10 2012 105 027 A1.

The laser beam or the laser beams used in a measuring system with several wavelengths/frequencies are each emitted via a commercially available laser diode, whereby the divergent beam of the laser diode is collimated via a collimator 84. This collimated beam is then collimated in a known manner via a channel of a mirror body onto a beam-output mirror 86 and is reflected in the direction of a device for beam tapering 88, which is equipped with a Galilei telescope. The resulting laser beam/measuring beam is then deflected via a tilted flat mirror 90 in the direction of the object to be measured and exits the rotor 2 through the aforementioned protection glass 42. The beam reflected by the measuring object correspondingly enters through the protection glass 42 into rotor 2 and is deflected via the tilted flat mirror 90 in the direction of the mirror body, which has a beam-input mirror 92, via which the reflected beams are deflected towards the detector of the laser-radar measurement system 72 (see FIG. 5). The basic structure of such a beam guidance is known, so that further explanations are not necessary.

In the diagram shown in FIG. 6, a focusing device 94 is also shown, which enables focusing with intensity adjustment in the close-up range. This focusing is accessible from the outside if a cover of housing part 8 is removed according to FIGS. 7 and 8.

Figure 7:
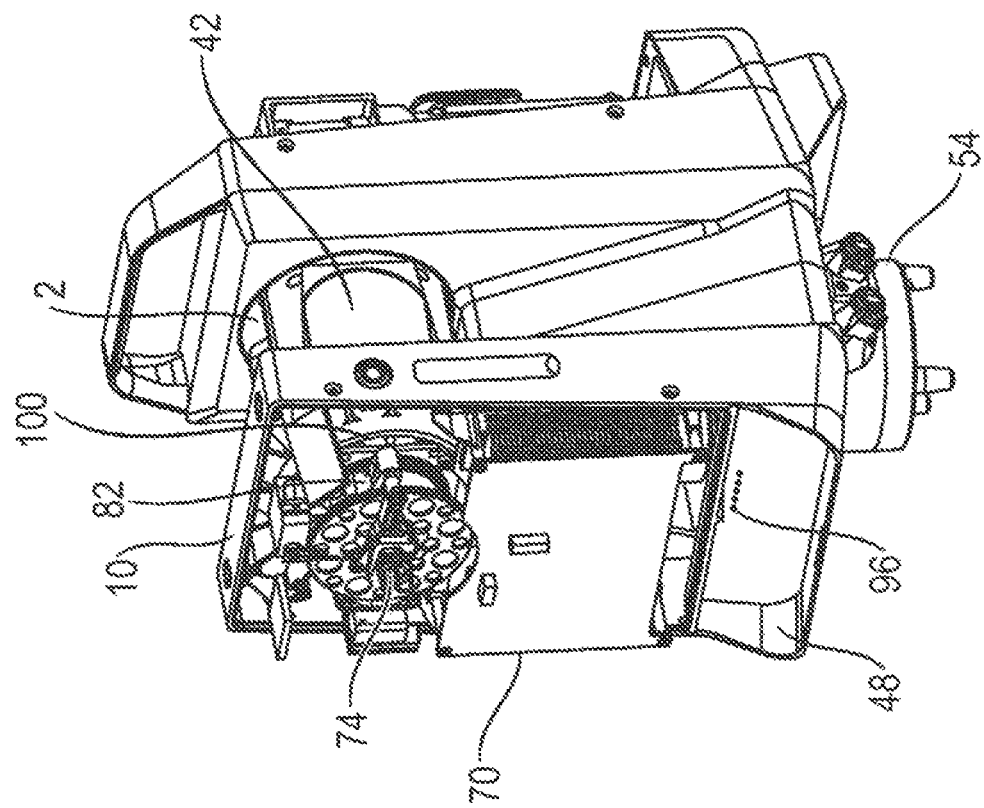

FIG. 7 shows the housing part 10 with removed cover, which also carries the touch display 20. When this cover is removed, the calculation unit 70 (CPU), the DC motor 82 and also the slip ring arrangement 74 are accessible. In the illustration according to FIG. 7, the accumulator 28 is also removed, so that the corresponding accommodation 48 with the electrical contacts 96 is visible.

Figure 8:
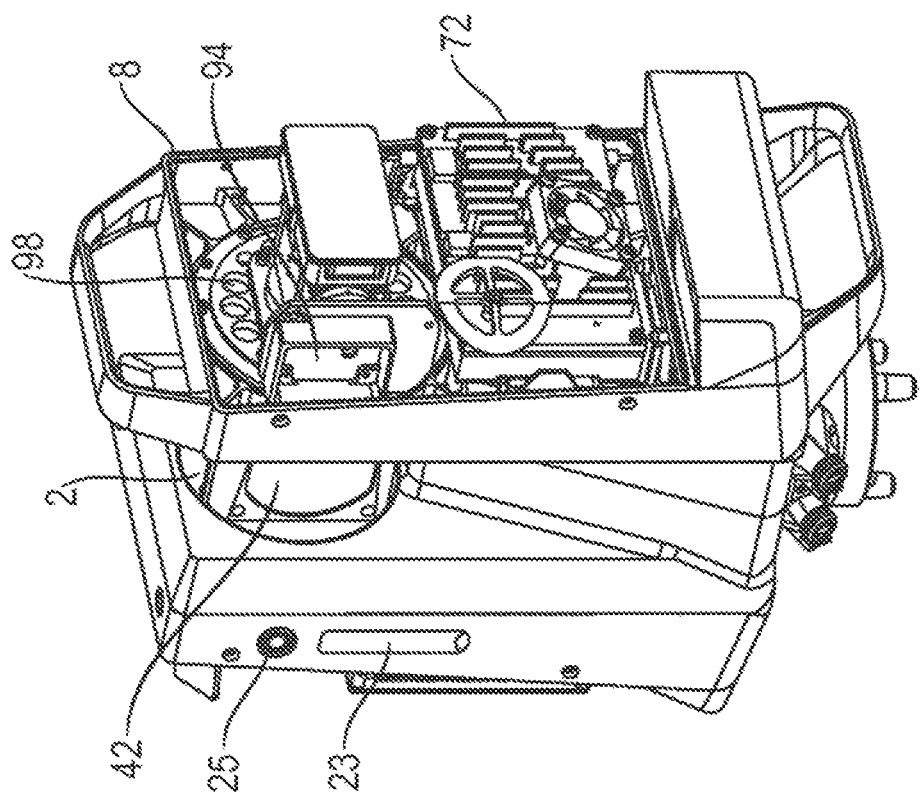
FIGS. 7 and 8 show views of the laser scanner according to FIG. 1 with the housing covers removed.

FIG. 8 shows the housing part 8 with the cover removed. The focusing device 94 and the beam guidance described above (with mirrors 86, 92 and the device for beam tapering 88) become accessible. The laser-radar measurement system 72 is located below the beam guidance. The bearing 98, 100 of rotor 2 is also visible in the illustrations according to FIGS. 7 and 8.

As explained above, according to the invention, the scan data and logging files generated during the measurement are stored on an internal drive (SSD, SATADOM) 104 of the calculation unit 70. For this purpose, the laser scanner 1 according to FIG. 9 is designed in such a way that this internal data memory can be removed, whereby operating system and program are stored on an internal flash memory and are not accessible from outside or cannot be overwritten. The internal drive 104 is accessible in the embodiment in FIG. 9 with the accumulator 28 removed. In the accommodation 48, a flap 102 is provided, which is locked or screwed, for example. When the flap 102 is open, the internal drive 104 with the scan data and the logging files can then be removed—due to the write protection of the internal flash memory, it is not possible for the laser scanner 1 to still contain further data. This ensures that the recorded data remain in the system and cannot be transmitted to the outside.

As explained at the beginning, it can in principle be provided to also arrange the operating system and the program on the removable memory/drive 104, so that the laser scanner 1 is "dead" after the removal of this drive 104—conclusions about previous measurements are then no longer possible.

Of course, the internal drive 104 can also be accommodated in the area of the calculation unit 70 in housing part 10.

In accordance with the invention, it can also be provided that the laser scanner is operated with three measuring frequencies, so that the measuring accuracy is significantly improved compared to conventional solutions with two measuring frequencies.

As mentioned above, the laser scanner is preferably equipped with a navigation unit, which makes it possible to determine the position even when no GNSS/GPS signal is available.

As explained at the beginning, further essential features of the laser scanner described are, in addition to the increase in security through the provision of a removable internal drive, also seen in the play-free drive of the vertical pivot axis and the arrangement of the accumulators as well as in the operation of the laser scanner with more than two measuring frequencies.

A laser scanner is disclosed in which scan data and logging files are only stored on a data memory that can be easily exchanged.

LIST OF REFERENCE SIGNS 1 laser scanner
2 rotor/rotating head
4 axis of rotation
6 housing
8 housing part
10 housing part
12 housing intermediate part
14 mounting flange
16 handle
18 handle
20 touch display
22 slot
23 cover
24 SD card
25 switch
26 accumulator
28 accumulator
30 pivot axis
32 power connection
34 LAN connection
36 color camera
38 light unit
40 fastening bolt
42 protection glass
44 reference module
46 battery
48 accommodation
50 accommodation
52 rotary drive
54 base
56 drive hub
58 bearing arrangement
60 axis
62 external teeth
64 drive pinion
66 motor
68 encoder
69 inclination measuring device
70 calculation unit
72 laser-radar measurement system 74 slip ring arrangement
76 camera mirror
78 camera window
80 objective
82 DC motor
84 collimator
86 beam-output mirror
88 device for beam tapering
90 tilted flat mirror
92 beam-input mirror
94 focusing device
96 contact
98 bearing
100 bearing
102 flap
104 internal drive

The invention claimed is:

1. Laser scanner comprising a rotor rotatably mounted on a housing, wherein an optics is provided for directing a measuring beam emitted from an emitter onto a measuring object or a beam reflected therefrom onto a detector, wherein a calculation unit is provided for controlling the laser scanner and for data processing, the calculation unit having an internal data memory on which the scan data processed by the calculation unit are stored, wherein the data memory is removably held in an accommodation of the housing, wherein an operating system and software for controlling the laser scanner are stored on the data memory so that the laser scanner is no longer functional after removal of the data memory.

2. Laser scanner according to patent claim 1, wherein the accommodation is accessible after removal of a cover or a functional component of the laser scanner.

3. Laser scanner according to claim 1, wherein the rotor is held between two housing parts which are connected to one another by means of a housing intermediate part tapering towards the rotor.

4. Laser scanner according to claim 1, wherein the housing is rotatable about a pivot axis arranged perpendicular to an axis of rotation of the rotor by means of a rotary drive.

5. Laser scanner according to patent claim 4, wherein the rotary drive comprises a play-free gear, and the angular position of the housing is detectable via an encoder arranged on an axis of the housing.

6. Laser scanner according to claim 1, wherein an accumulator is held on each housing part and the housing parts and the accumulators are designed such that the rotating masses and outer geometries is approximately balanced with respect to the pivot axis and that a tilting moment with respect to a support of the laser scanner is minimal.

7. Laser scanner according to patent claim 6, wherein the accumulators complement one another with a cover of the respective housing part to form a structural unit.

8. Laser scanner according to claim 1, wherein a touch display arranged in vertical format is arranged on a housing part.

9. Laser scanner according to claim 1, wherein the laser scanner is operated with three measuring frequencies according to the measuring principle of phase shift.

10. Laser scanner according to claim 1, wherein the outer surfaces of the housing are substantially smooth-surfaced.

11. Laser scanner according to claim 1, wherein the calculation unit has an internal memory on which the operating system and the control software for the laser scanner are stored, this internal memory being provided with a write protection.

12. Laser scanner according to claim 1, wherein the removable internal data memory is an SSD memory.

* * * * *